United States Patent

[11] 3,610,951

[72] Inventor Robert E. Howland
Stamford, Vt.
[21] Appl. No. 813,020
[22] Filed Apr. 3, 1969
[45] Patented Oct. 5, 1971
[73] Assignee Sprague Electric Company
North Adams, Mass.

[54] DYNAMIC SHIFT REGISTER
4 Claims, 3 Drawing Figs.

[52] U.S. Cl. ........ 307/221, 307/205, 307/246, 307/251, 328/37
[51] Int. Cl. ........ G11c 19/00
[50] Field of Search ........ 307/205, 221, 246, 251, 279, 304; 328/37

[56] References Cited

UNITED STATES PATENTS

| | | | |
|---|---|---|---|
| 3,395,292 | 7/1968 | Bogert........ | 307/221 |
| 3,457,435 | 7/1969 | Burns et al........ | 307/251 |
| 3,461,312 | 8/1969 | Farber et al. ........ | 307/221 |

OTHER REFERENCES

Sidorsky, MTOS Shift Registers, General Instrument Corp. Application Notes, Dec. 1967, pp. 1–7, 307/246

Pomeranz et al., FET Inverter, IBM Technical Disclosure Bulletin, May 1968, p. 1823. 307/205

Boysel et al., Multiphase Clocking Achieves 100- Nsec MOS Memory, Electronic Design News, June 10, 1968, pp. 50–52, 54, & 55. 307/205

*Primary Examiner*—Stanley T. Krawczewicz
*Attorneys*—Connolly and Hutz, Vincent H. Sweeney, James Paul O'Sullivan and David R. Thornton

ABSTRACT: A pair of charge transfer stages are serially connected and alternately triggered by out-of-phase clock pulses for transfer of a single information bit. Each stage includes a pair of clock-controlled transistors and a data-controlled transistor interconnected such that the output of the transfer stage is first charged to clock voltage and then selectively discharged to clock ground in accordance with the data input signal.

DYNAMIC SHIFT REGISTER

BACKGROUND OF THE INVENTION

The present invention relates to shift registers and in particular to a dynamic shift register having very low power dissipation.

In the prior art, dynamic shift registers which employ insulated gate field-effect transistors as switches are available. These circuits, however, often require the expenditure of relatively large amounts of power and widely different gate areas for efficient operation; or the use of several clock phases for each stage.

It is an object of this invention to provide a low-power dynamic shift register.

It is another object of this invention to provide a low-power shift register having two-phase clock control.

It is a further object of the invention to provide a dynamic shift register utilizing a minimum number of components.

It is a further object of this invention to provide a shift register including a charge transfer switch for isolated and synchronous feedback.

These and other objects of the invention will be apparent upon consideration of the specification and claims taken in conjunction with the drawing.

SUMMARY OF THE INVENTION

Broadly, a shift register provided in accordance with the invention comprises: at least one charge transfer stage having a first and second clock-controlled switch means, a data-controlled switch means, and a charge-storing means; each of said switch means having a pair of output terminals and a control terminal; the output terminals of said first switch means coupled between a data input terminal of said transfer stage and the control terminal of said data switch means; the output terminals of both said second switch means and said data switch means coupled in parallel between clock input and output terminals of said stage; the control terminals of said first switch means and said data switch means coupled to said clock input terminal; and said charge-storing means coupled between the control means of said data switch means and ground such that during a first voltage stage of said clock, said stage output terminal is charged to said one voltage state and a data signal is transferred from said stage input terminal to said charge-storing means, and during a subsequent second voltage state of said clock said output terminal is selectively discharged to said second voltage state in accordance with the data signal stored in said charge-storing means.

DESCRIPTION OF THE PREFERRED EMBODIMENTS

Figure 1:
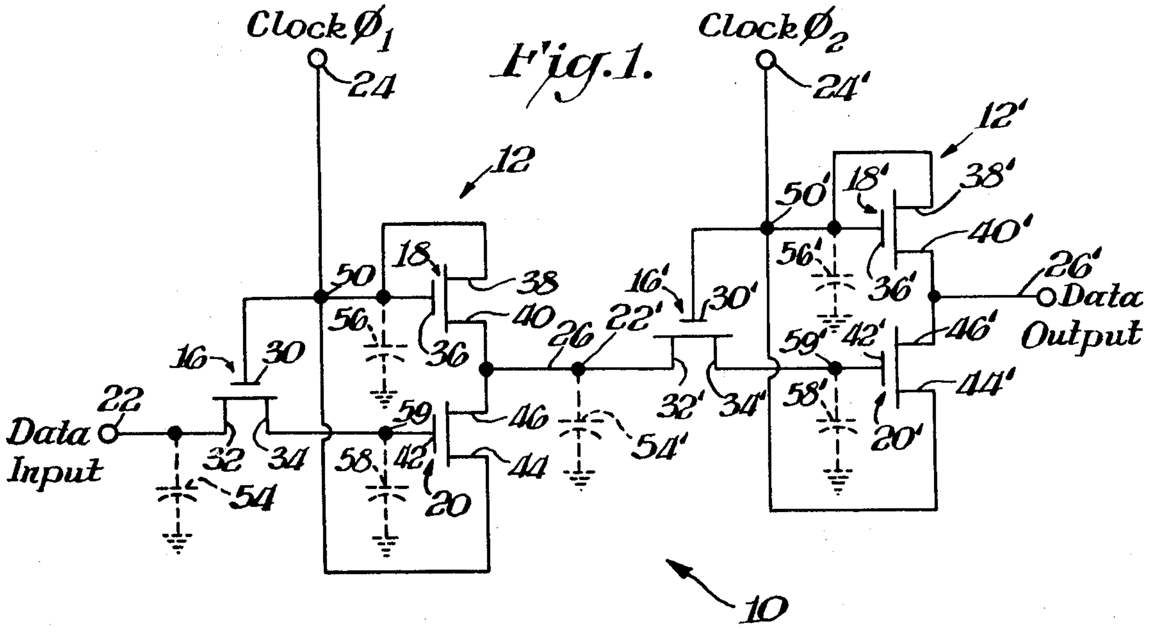
FIG. 1 is a schematic diagram of a shift register having a single-bit delay stage provided in accordance with the invention.

A single-bit delay stage or register 10 is shown in FIG. 1. Each register stage 10 is made up of a pair of identical charge transfer stages 12 and 12′ which are alternately triggered by out-of-phase clock pulses $\Phi_1$ and $\Phi_2$. Transfer stages 12 and 12′ are connected in series such that the output of the first transfer stage 12 provides the input for transfer stage 12′. Taken together, both transfer stages 12 and 12′ provide a single-bit register, it being understood that as many such single-bit registers may be serially connected as desired.

Each charge transfer stage includes three switching means designated as transistors 16, 18 and 20 for stage 12 and 16′, 18′ and 20′ for stage 12′. Likewise, each stage has a data input lead or terminal 22 and 22′, a clock input terminal 24 and 24′, and an output terminal 26 and 26′ respectively.

For convenience, operation of transfer stage 12 will be described in detail, and it is to be understood that operation of the second stage 12′ will be identical except for clock timing which will be in accordance with clock $\Phi_2$.

Each transistor includes a pair of output means or terminals such as source and drain terminals. Each also includes a control terminal, such as a gate or the like, which upon application of a voltage of the correct magnitude and polarity will render the transistor conductive, and in effect, conductively coupled its output terminals to each other. Hence, transistor 16 includes a gate 30, a source 32 and a drain 34. Similarly, transistor 18 includes a gate 36, a source 38 and drain 40, and transistor 20 has a gate 42, a source 44 and a drain terminal 46.

Transistors 16 and 18 have their respective gates 30 and 36 connected in common at junction 50 to clock terminal 24, and are designated as clock-controlled transistors since they function in accordance with the voltage state of this clock signal source. Transistor 20, on the other hand, has its gate terminal 42 in connection to drain terminal 34 of transistor 16, and is designated as a data-controlled transistor since it functions in accordance with the data input signal passed by transistor 16.

Transistors 18 and 20 are connected in parallel between clock terminal 24 and transfer stage output 26. Hence, their drain terminals 40 and 46 are connected in common at junction 52 while their source terminals 38 and 44 are connected in common to junction 50. The circuit is completed by connection of output terminals 32 and 34 of transistor 16 to data input 22 and gate 42, respectively.

In the preferred embodiment, the capacitance between electrodes and ground (for example, between junction forming regions and the substrate in integrated circuits etc.) are utilized. The pertinent capacitances are shown in the diagram in dotted lines. Thus capacitor 54 is shown coupling input 22 to ground, capacitor 56 couples gate 36 to ground, and capacitor 58 couples gate 42 (node 59) of transistor 20 to ground.

In operation of the single transfer stage 12, a clock signal source $\Phi_1$ is fed to clock terminal 24. The clock signal is made to have two voltage states; (shown in FIG. 2) that is, a ground or zero voltage state and a negative voltage E which is of sufficient magnitude to render the transistors conductive. An information or data signal source having voltage states similar to that of the clock is delivered to input 22. In this case, ground voltage represents a logic "0" while E voltage represents a logic "1" of the information source.

When clock $\Phi_1$ is at voltage level E, clock-controlled transistors 16 and 18 are rendered conductive so that clock voltage charges capacitor 54′ (at output 26) while the data input voltage (logic "1" and "0"), which is passed by transistor 16, charges (or discharges) capacitor 58. Since the voltage of gate 42 will be that of capacitor 58, the conductivity of transistor 20 is determined by the data input. Subsequently, when clock $\Phi_1$ drops back to ground voltage, output 26 will be held at clock voltage E or discharged to clock ground depending upon the conductivity state of transistor 20 or that is, the voltage state of the charge storage capacitor 58.

Consequently, if logic "0" is provided at input 22 during the E voltage interval of clock $\Phi_1$, transistor 20 will be rendered nonconductive (any previous charge of capacitor 58 will discharge to data input ground through transistor 16) and output 26 will remain at voltage E after clock $\Phi_1$ returns to ground. Conversely, if logic "1" is applied to input 22, transistor 20 is rendered conductive during the voltage pulse of clock $\Phi_1$ and retained in this state by the charge of capacitor 58 after clock $\Phi_1$ returns to ground so that output 26 (capacitor 54′) is discharged to clock ground through transistor 20.

Hence, each transfer stage provides an inversion of the data input thereto, and if output 26 of the first stage is fed through an identical second stage 12′ which is triggered by an out-of-phase signal source $\Phi_2$, output 26′ of the second stage will provide the logic of the data input 22 but delayed in accordance with clock timing.

Figure 2:
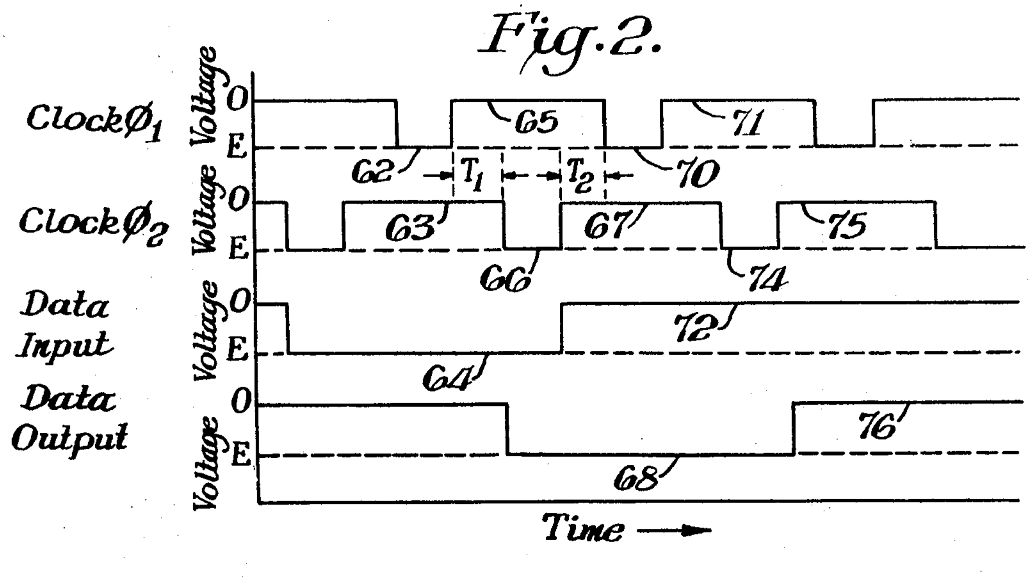
FIG. 2 is a graphical representation of the clock time relationship for the shift register shown in FIG. 1.

This can be more clearly explained in reference to FIG. 2. Herein representative clock and data input voltages are displayed against time. As shown, clock $\Phi_1$ is first pulsed at 62 to a negative voltage E and then back to zero voltage or ground. During this interval clock $\Phi_2$ is at ground potential at 63 while the data input is at E voltage or logic "1" as shown at 64.

Pulse 62 initially triggers the first transfer stage 12, then upon decay of this pulse to zero as shown at 65, clock $\Phi_1$ provides inverse data at input 22' of second stage 12'. After a time $T_1$, clock $\Phi_2$ is pulsed as at 66 to trigger the second stage and subsequently, upon its decay, to zero as shown at 67 completes the transfer of the logic "1" to register output 26' as shown at 68.

In the next cycle, clock $\Phi_1$ is again pulsed to E voltage as at 70 and then to zero as at 71. During this negative interval, clock $\Phi_2$ is still at ground potential but the data input has changed to a logic "0" or zero potential as shown at 72. Of course, it should be understood that logic "1" could have been repeated and that the actual data input sequence may be varied as desired. Pulse 70 triggers stage 12 and upon its decay, provides inverse data at 22'. Then after a short time interval $T_1$ clock $\Phi_2$ is pulsed to E as at 74 and back to ground as at 75. This triggers the second transfer stage and transfers logic "0" to the bit register output 26' as shown at 76.

Since each transfer stage of the register completes the data transfer upon or subsequent to the decay of its trigger, or shift pulse, the operation of any subsequent transfer stage must be delayed a suitable time. For example, pulse 66 of clock $\Phi_2$ is initiated a time $T_1$ after pulse 62 of clock $\Phi_1$ and terminated a time $T_2$ before the next pulse of this clock. The minimum time between pulses and minimum clock pulse width depends essentially upon the time required to charge capacitors 54, 54', 58 and 58' while maximum time between pulses depends upon the leakage rate of these capacitors. For example, with high-switching speed of the circuit, the time delay $T_1$ and $T_2$ can be quite small. This coupled with the fact that the clock pulse can be relatively narrow as indicated above allows the register stage to be operated at high frequencies. Finally, it should be realized that since transistors 16 and 16' control data isolation and that these will be conductive throughout their respective clock pulses, logic "1" input pulses should be in phase with and substantially equal to or exceed the width of the negative clock pulse.

Since correct operation of the shift register requires a gate potential of sufficient magnitude (and negative polarity) to cause transistor conduction, both the ratio of node capacitances and the relationship of this ratio to the negative clock potential E is important.

For example, assuming logic "0" was applied at the start of a cycle, when a complete cycle of register 10 nears completion (clock $\Phi_2$ drops to zero voltage as shown at 75) node 26' should be discharged through transistor 20' to zero voltage. This requires that the potential applied to gate 42' (voltage of capacitor 58') be sufficiently negative to cause conduction of transistor 20'.

The potential across capacitor 58' will be proportional to both the negative potential E (of clock $\Phi_1$) and the ratio of the capacitance of capacitor 54' to 58'. This ratio is controlled in an integrated arrangement by control of component and interconnection geometries.

It should be understood that the indicated capacitors include all the capacitance associated with its particular node. For example, capacitance 58' of node 59' is made up of gate capacitance 42', the junction capacitance of drain 34' and the capacitance of the metallized interconnection between 34' to 42'. Similarly the capacitance of 54' is made up of the capacitance of the regions (32', 40 and 46) to which it is connected and their interconnection. Hence, the sum of the capacitances of one node must be controlled with respect to sum at the other node.

For proper circuit operation, the required value of this ratio depends upon the magnitude of clock potential E and the potential required at 42' to render transistor 20' conductive. However, since power dissipation is proportional to circuit capacitance values and to the square of the negative clock potential E, it is desirable to provide as low a potential E as possible consistent with a practical capacitor ratio and with the gate potential required for transistor conduction.

In considering power dissipation, it should be realized that during a full cycle of clock $\Phi_1$, that is, from clock ground to full pulse voltage and back to clock ground, capacitors 56 and 54' are both charged. However, while the power dissipated in charging capacitor 56 is wasted (since it performs no essential circuit function) the power dissipated in capacitor 54' is used in propagating the digital information through the shift register. Hence, minimization of capacitor 56 is consistent with minimum power. Furthermore, since capacitor 58' receives its charge from that of 54', then minimization of capacitor 58' is also consistent with minimum power. The value of capacitor 54' will then be determined by the desired ratio of capacitor 54' to capacitor 58'.

A capacitor ratio of 3:1 is reasonable, and as an example, capacitor 56 and 58 may be designed for 1 pf. and capacitor 54 of 3 pf.

Many different embodiments are possible of course. For example the shift register although preferably provided in an integrated embodiment could actually utilize discrete components if the packaging capacitance is sufficiently minimized. Preferably however, the structure would utilize integrated MOS transistors having substantially identical geometric configurations.

Figure 3:
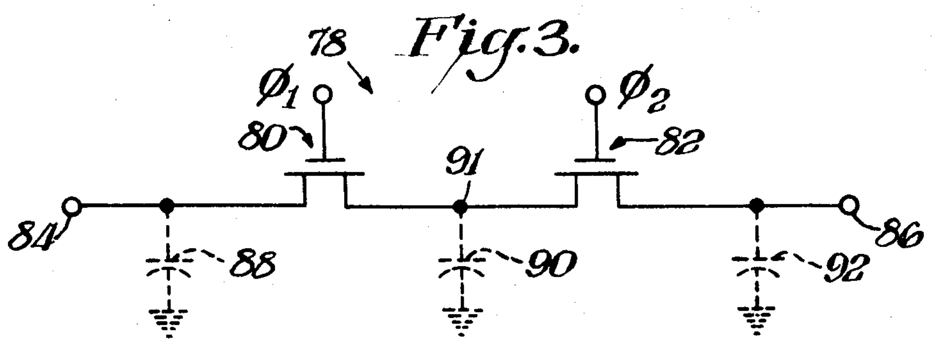
FIG. 3 is a schematic diagram of a charge transfer switch suitable for use with the register of FIG. 1.

FIG. 3 schematically illustrates a charge transfer switch 78 which provides a unilateral transfer path and time delay such that in combination with the shift register of FIG. 1 permits isolated transfer of information to a different node in synchronization to the transfer of the information through the bit stage.

Charge transfer switch 78 utilizes a pair of unipolar transistors 80, 82 connected in series between nodes or terminals 84, 86 with capacitors 88, 90 and 92 connected between this conductive path and ground. The capacitances are shown in dotted outline since they are provided in part in the integrated embodiment by the parasitic capacitance between transistor elements and ground.

In operation, transistors 80 and 82 are sequentially energized by connection of their respective gates to clock $\Phi_1$ and clock $\Phi_2$ signal sources, for example. Activation of transistor 80 transfers or conducts a portion of the charge or voltage of terminal 84 (charge on capacitor 88) to the central capacitor 90 and central node 91. Then in accordance with clock operation, transistor 80 is rendered nonconductive while transistor 82 is rendered conductive. The latter transfers a portion of the charge of capacitor 90 to capacitor 92 and node 86. Thus, a portion of the charge representing information at terminal 84 is transferred to terminal 86 in synchronization with clock operation while isolation between nodes is maintained.

This charge transfer switch may be incorporated in the shift register by connection of transistor 82 to node 59 of stage 12. Hence, nodes 84 and 91 become nodes 22 and 59 respectively, and transistor 16 of transfer stage 12 replaces transistor 80 so that in operation of register 10 the information at its input 22 is simultaneously shifted through this single bit stage to its output 26' and also switched synchronously to node 86 where it may be utilized for synchronous feedback to the input of a preceding register or the like. This permits isolated transfer of input information of one of a series bit stage to any preceding stage, or any other bit stage, at the same time as the information is transferred to the output of said one stage.

Transfer switch 78 imposes certain conditions on the capacitances necessary for its operation, and hence also imposes conditions on the register in which it is incorporated. Again considering FIG. 3, and assuming that capacitors 88, 90 and 92 are $C_1$, $C_2$ and $C_3$ respectively, and with a voltage $V_{in}$ (logic "1") on terminal 84, a signal $\Phi_1$ will cause conduction of transistor 80 which transfers a portion of the charge of capacitor 88 to capacitor 20 in the proportion $C_1/C_1+C_2$. Hence, the voltage at center junction 91 becomes approximately $V'=V_{in}C_1/C_1+C_2$.

After removal of signal $\Phi_1$ and application of signal $\Phi_2$ transistor 82 conducts and transfers a portion of the charge of capacitor 90 (junction 91) to capacitor 92 and terminal 86 in the proportion $C_2/C_2+C_3$ such that the charge voltage $V_{out}$ of terminal 86 becomes approximately equal to $V_{in}[C_1C_2/(C_1+{}_2)(C_2+{}_3)]$.

For zero voltage (logic "0") on terminal 84, activation of transistor 80 discharges capacitor 90 to ground, and subsequent activation of transistor 82 discharges capacitor 92 to capacitor 90 such that the voltage at terminal 86 becomes $V_{out}=V_n[C_1C_2C_3/(C_1+C_2)(C_2+C_3)]$; where $V_{in}$ was the original (logic "1") level.

Since this is a dynamic circuit, certain boundary conditions must be imposed on the timing relationship of $\Phi_1$ and $\Phi_2$. The pulse length of duration of signals $\Phi_1$, $\Phi_2$ must have a minimum duration to provide enough time for proper charging of the storage capacitors, while delay between application of $\Phi_1$ and $\Phi_2$ must be less than the leakage time of the capacitors. Hence, these factors provide the outer limits of frequency of operation of the switch.

For proper operation (i.e., insuring that a sufficient portion of $V_{in}$ is transferred when it is at logic "1"; and sufficient discharge of $V_{out}$ when $V_{in}$ is at logic "0") the values of capacitors 88, 90 and 92 should be optimized. Of course, in the preferred embodiment, the circuit is produced in an integrated arrangement where portions of the capacitors are provided by parasitic capacitance of the structure.

For maximum transfer, capacitor 92 must have the smallest capacitance, and since its value is predetermined by the parasitic capacitance of terminal 86 the values of capacitors 88 and 90 are accordingly adjusted by adding MOS gate oxide area to terminals 84 and 91.

In a specific example, $V_{out}$ was chosen as 0.7 $V_{in}$ for logic "1" and 0.08 $V_{in}$ for logic "0." For the logic "1" case, the ratio of $C_1/C_2$ should generally fall within 3 to 24, and $C_2/C_3$ within 3 to 15. For the logic "0" case, $C_2/C_3$ must be between 4 to 10 and no limits are imposed on $C_1/C_2$. For suitable operation, a ratio of $C_1$:$C_2$:$C_3$ of 36:9:1 was chosen. This should provide a logic "1" output of approximately 0.72 $V_{in}$ and a logic "0" output of approximately 0.74 $V_{in}$. In a suitable example, $C_3$ may be set at 1 pf., and $C_2$ at 9 pf. and $C_1$ at 36 pf. Preferably $C_3$ would be made much less than 1 pf. and as small as possible in order to reduce $C_1$.

When switch 78 is incorporated in the register, $C_1$ is the capacitance of terminal 22 while $C_2$ is the capacitance of terminal 59 so that the ratio of 36:9 (4:1) is imposed on these capacitances and takes precedence over the normal ratio for this register as previously indicated in regard to FIG. 1.

Although the invention has been described with respect to a specific embodiment, many embodiments are possible without departing from the spirit and scope of the invention and it is to be understood that the invention is not to be limited except as in the appended claims.

What is claimed is:

1. A single-bit delay register comprising a pair of identical charge transfer stages, each of said stages having a data input terminal and a clock input terminal and an output terminal, the output terminal of the first of said stages being serially connected to the input terminal of the second of said stages, each of said stages including first and second clock-controlled transistor switch means and a data-controlled transistor switch means, said first and second clock-controlled transistor switch means having a common connection to said clock terminal, one of said clock-controlled transistor switch means connected in parallel with said data-controlled transistor switch means between said clock terminal and said output terminal, a clock signal source to the clock terminal of said second stage being out of phase with a clock signal source of said first stage such that said first and second stages are alternately triggered by out of phase clock pulses for transfer of a single information bit.

2. The register of claim 6 wherein each of said stages includes a charge-storing means; each of said switch means having a pair of output terminals and a control terminal; the output terminals of said first switch means coupled between said data input terminal and the control terminal of said data-controlled switch means; the output terminals of both said second switch means and said data-controlled switch means being connected in parallel between said clock input terminal and said stage output terminal; the control terminals of said first and second switch means coupled to said clock input terminal; and said charge-storing means coupled between the control means of said data switch means and ground such that during a first voltage state of said clock source said stage output terminal is charged thereto and a data signal is transferred from said data input terminal to said charge-storing means, and during a second voltage state of said clock source said stage output terminal is selectively discharged to said second voltage state in accordance with data input stored in said charge-storing means so as to provide an output response which is inverted with respect to said data input.

3. The register of claim 1 wherein all said switch means are field-effect transistors with substantially identical geometric configurations, and said charge-storing means includes the gate capacitance of said data controlled switch means.

4. The register of claim 3 including a charge transfer switch in combination with said first transfer switch including another field-effect transistor having its gate terminal in connection to said second clock source and its output terminals connected to the gate of said data-controlled transistor switch means and to another output terminal such that upon operation of said single bit stage a charge proportional to the input data to said single bit stage is transferred to said other output terminal in synchronization with the transfer to the output of said single bit stage.